(12) United States Patent
Jiménez et al.

(10) Patent No.: US 12,744,706 B2
(45) Date of Patent: Sep. 22, 2026

(54) ENABLING CONFIGURING AN ENDPOINT DEVICE

(71) Applicant: Telefonaktiebolaget LM Ericsson (publ), Stockholm (SE)

(72) Inventors: Jaime Jiménez, Espoo (FI); Valentin Tudor, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 67 days.

(21) Appl. No.: 18/845,249

(22) PCT Filed: Mar. 10, 2022

(86) PCT No.: PCT/EP2022/056271
§ 371 (c)(1),
(2) Date: Sep. 9, 2024

(87) PCT Pub. No.: WO2023/169687
PCT Pub. Date: Sep. 14, 2023

(65) Prior Publication Data

US 2025/0193071 A1 Jun. 12, 2025

(51) Int. Cl.
*H04L 41/0803* (2022.01)
*H04L 41/0896* (2022.01)

(52) U.S. Cl.
CPC ...... *H04L 41/0803* (2013.01); *H04L 41/0896* (2013.01)

(58) Field of Classification Search
CPC ........................ H04L 41/0803; H04L 41/0896
See application file for complete search history.

(56) References Cited

U.S. PATENT DOCUMENTS 10,321,311 B2 6/2019 Sasin et al.
2010/0257346 A1* 10/2010 Sosnosky ............ H04L 67/1095 713/2

(Continued)

FOREIGN PATENT DOCUMENTS

WO WO-2020157453 A1 * 8/2020 .............. H04W 4/70
WO 2020/253931 A1 12/2020

(Continued)

OTHER PUBLICATIONS

International Search Report and Written Opinion in PCT/EP2022/056271 dated Oct. 12, 2022, 18 pages.

(Continued)

*Primary Examiner* — Clayton R Williams
(74) *Attorney, Agent, or Firm* — Rothwell, Figg, Ernst & Manbeck, P.C.

(57) ABSTRACT

It is provided a method for enabling configuring an endpoint device. The method comprises: receiving a network access request, the network access request comprising a parameter request comprising a reference to a storage server for obtaining one or more device parameters; obtaining the device parameters from the storage server; providing the parameter request to a local bootstrap server that is on the same local network as the network access server; receiving a command from the local bootstrap server to configure the local network such that traffic on the local network to a remote bootstrap server, being external to the local network, is directed to the local bootstrap server; configuring the local network such that traffic on the local network to the remote bootstrap server, being external to the local network, is directed to the local bootstrap server; and providing a network resource allocation message to the endpoint device.

21 Claims, 4 Drawing Sheets

(56) References Cited

U.S. PATENT DOCUMENTS

| | | | |
|---|---|---|---|
| 2011/0016321 A1 | 1/2011 | Sundaram et al. | |
| 2017/0041287 A1* | 2/2017 | Pak | H04L 12/18 |
| 2020/0034155 A1* | 1/2020 | Bilal | G06F 9/4416 |
| 2020/0274719 A1 | 8/2020 | Pak et al. | |
| 2021/0342163 A1 | 11/2021 | Ocak et al. | |

FOREIGN PATENT DOCUMENTS

| | | |
|---|---|---|
| WO | 2021/177871 A1 | 9/2021 |
| WO | 2023/169688 A1 | 9/2023 |

OTHER PUBLICATIONS

International Search Report and Written Opinion in PCT/EP2022/056272 dated Oct. 12, 2022, 15 pages.

Arkko, J., et al., "RFC 9039 Uniform Resource Names for Device Identifiers," Internet Engineering Task Force (IETF), RFC:9039; ISSN:2070-1721, Jun. 2021, 15 pages.

Cisco's MUD Process Flow, (Date Unknown), 1 page.

Lear, E., et al., "Manufacturer Usage Description Specification," Internet Engineering Task Force (IETF), ISSN: 2070-1721, Mar. 2019, 60 pages.

Open Mobile Alliance, "Lightweight Machine to Machine Technical Specification:Core," Approved Version: 1.2—Nov. 10, 2020, OMA-TS-LightweightM2M_Core-V1_2-20201110-A, 2021, 139 pages.

Selander, G., et al., "Object Security for Constrained RESTful Environments (OSCORE)," Internet Engineering Task Force (IETF), ISSN: 2070-1721, Jul. 2019, 94 pages.

* cited by examiner

ENABLING CONFIGURING AN ENDPOINT DEVICE

CROSS REFERENCE TO RELATED APPLICATION(S)

This application is a 35 U.S.C. § 371 National Stage of International Patent Application No. PCT/EP2022/056271, filed Mar. 10, 2022, designating the United States.

TECHNICAL FIELD

The present disclosure relates to methods, a network access server, a local bootstrap server, an endpoint device, computer programs, computer program products, and a system. More particularly, but not-exclusively, the disclosure relates to the configuration of an endpoint device.

BACKGROUND

The use of IoT (Internet-of-Things) devices is increasing steadily and find new applications in many different fields. IoT devices are by nature often limited in terms of available resources. Also, IoT devices benefit from being easily deployed, preferably without any manual configuration.

One way to simplify deployment is to use a LwM2M (Lightweight Machine-to-Machine) bootstrap procedure defined by OMA (Open Mobile Alliance) (Open Mobile Alliance, Lightweight Machine to Machine Technical Specification: Core, V1.2; 2020 Nov. 10). This procedure provides a mechanism for a LwM2M client in the IoT device to retrieve bootstrap information from an LwM2M bootstrap server to enable boot and e.g. firmware updates.

In the LwM2M procedure, the LwM2M client connects to a LwM2M Bootstrap-Server to obtain a bootstrap pack for configuration of the IoT device. The bootstrap pack contains at a minimum an LwM2M server account and may contain additional objects, e.g. for access control and connectivity monitoring. In this way, the IoT device can be configured using a single message, which may contain several objects.

However, for security reasons, it may be desirable to prevent IoT endpoint devices from reaching external networks.

SUMMARY

One object is to improve configuration of an endpoint device connectable to a local network.

According to a first aspect, it is provided a method for enabling configuring an endpoint device. The method is performed by a network access server. The method comprises: receiving a network access request from the endpoint device, the network access request comprising a parameter request, the parameter request comprising a reference to a storage server for obtaining one or more device parameters, wherein the endpoint device is on a local network also comprising the network access server; obtaining the device parameters from the storage server based on the reference; providing the parameter request to a local bootstrap server that is on the same local network as the network access server; receiving a command from the local bootstrap server to configure the local network such that traffic on the local network to a remote bootstrap server, being external to the local network, is directed to the local bootstrap server; configuring the local network such that traffic on the local network to the remote bootstrap server, being external to the local network, is directed to the local bootstrap server; and providing a network resource allocation message to the endpoint device.

The configuring the local network may comprise configuring a domain name service of the local network.

The parameter request may comply with a specification for Manufacturer Usage Description as defined in Internet Engineering Task Force Request for Comments, 8520. (Lear, E., Droms, R., and D. Romascanu, "Manufacturer Usage Description Specification," RFC 8520 March 2019)

The device parameters may comprise access control parameters.

The network access request may comply with Link Layer Discovery Protocol, Dynamic Host Configuration Protocol, or Institute of Electrical and Electronics Engineers, 802.1x.

The reference may be in the form of a Uniform Resource Identifier.

The method may further comprise: verifying integrity of the parameter request.

The method may further comprise: configuring an access control list based on the device parameters.

According to a second aspect, it is provided a network access server for enabling configuring an endpoint device. The network access server comprises: a processor; and a memory storing instructions that, when executed by the processor, cause the network access server to: receive a network access request from an endpoint device, the network access request comprising a parameter request, the parameter request comprising a reference to a storage server for obtaining one or more device parameters, wherein the endpoint device is on a local network also comprising the network access server; obtain the device parameters from the storage server based on the reference; provide the parameter request to a local bootstrap server that is on the same local network as the network access server; receive a command from the local bootstrap server to configure the local network such that traffic on the local network to a remote bootstrap server, being external to the local network, is directed to the local bootstrap server; configure the local network such that traffic on the local network to the remote bootstrap server, being external to the local network, is directed to the local bootstrap server; and provide a network resource allocation message to the endpoint device.

The instructions to configure the local network may comprise instructions that, when executed by the processor, cause the network access server to configure a domain name service of the local network.

The parameter request may comply with a specification for Manufacturer Usage Description as defined in Internet Engineering Task Force Request for Comments, 8520.

The device parameters may comprise access control parameters.

The network access request may comply with Link Layer Discovery Protocol, Dynamic Host Configuration Protocol, or Institute of Electrical and Electronics Engineers, 802.1x.

The reference may be in the form of a Uniform Resource Identifier.

The network access server may further comprise instructions that, when executed by the processor, cause the network access server to: verify integrity of the parameter request.

The network access server may further comprise instructions that, when executed by the processor, cause the network access server to: configure an access control list based on the device parameters.

According to a third aspect, it is provided a computer program for enabling configuring an endpoint device. The computer program comprises computer program code which, when executed on a network access server causes the network access server to: receive a network access request from an endpoint device, the network access request comprising a parameter request, the parameter request comprising a reference to a storage server for obtaining one or more device parameters, wherein the endpoint device is on a local network also comprising the network access server; obtain the device parameters from the storage server based on the reference; provide the parameter request to a local bootstrap server that is on the same local network as the network access server; receive a command from the local bootstrap server to configure the local network such that traffic on the local network to a remote bootstrap server, being external to the local network, is directed to the local bootstrap server; configure the local network such that traffic on the local network to the remote bootstrap server, being external to the local network, is directed to the local bootstrap server; and provide a network resource allocation message to the endpoint device.

According to a fourth aspect, it is provided a method for enabling configuring an endpoint device the method being performed by a local bootstrap server. The method comprises: receiving a parameter request, the parameter request comprising a reference to a storage server for obtaining one or more device parameters, wherein the endpoint device is on a local network also comprising the local bootstrap server; obtaining the device parameters from the storage server based on the reference; determining that the endpoint device supports a server-assisted bootstrapping procedure; obtaining remote bootstrap data from a remote bootstrap server being external to the local network; generating a bootstrap data structure based on the device parameters and the remote bootstrap data; transmitting a command to a network access server to configure the local network such that traffic on the local network to the remote bootstrap server is directed to the local bootstrap server; receiving a bootstrap request from the endpoint device; and transmitting the bootstrap data structure to the endpoint device.

The bootstrap procedure may comply with specifications of Open Mobile Alliance, Lightweight Machine to Machine.

The determining that the endpoint device supports a server-assisted bootstrapping procedure may be based on the device parameters.

The receiving a parameter request may comprise receiving the parameter request from a network access server.

The device parameters may comprise access control parameters, in which case the generating a bootstrap data structure is based on the access control parameters.

The reference may be in the form of a Uniform Resource Identifier.

According to a fifth aspect, it is provided a local bootstrap server for enabling configuring an endpoint device. The bootstrap server comprises: a processor; and a memory storing instructions that, when executed by the processor, cause the local bootstrap server to: receive a parameter request, the parameter request comprising a reference to a storage server for obtaining one or more device parameters, wherein the endpoint device is on a local network also comprising the local bootstrap server; obtain the device parameters from the storage server based on the reference; determine that the endpoint device supports a server-assisted bootstrapping procedure; obtain remote bootstrap data from a remote bootstrap server being external to the local network; generate a bootstrap data structure based on the device parameters and the remote bootstrap data; transmit a command to a network access server to configure the local network such that traffic on the local network to the remote bootstrap server is directed to the local bootstrap server; receive a bootstrap request from the endpoint device; and transmit the bootstrap data structure to the endpoint device.

The bootstrap procedure may comply with specifications of Open Mobile Alliance, Lightweight Machine to Machine.

The instructions to determine that the endpoint device supports a server-assisted bootstrapping procedure may comprise instructions that, when executed by the processor, cause the local bootstrap server to determine that the endpoint device supports a server-assisted bootstrapping procedure based on the device parameters.

The instructions to receive a parameter request may comprise instructions that, when executed by the processor, cause the local bootstrap server to receive the parameter request from a network access server.

The device parameters may comprise access control parameters, in which case the instructions to generate a bootstrap data structure comprise instructions that, when executed by the processor, cause the local bootstrap server to generate the bootstrap data structure based on the access control parameters.

The reference may be in the form of a Uniform Resource Identifier.

According to a sixth aspect, it is provided a computer program for enabling configuring an endpoint device. The computer program comprises computer program code which, when executed on a local bootstrap server causes the local bootstrap server to: receive a parameter request, the parameter request comprising a reference to a storage server for obtaining one or more device parameters, wherein the endpoint device is on a local network also comprising the local bootstrap server; obtain the device parameters from the storage server based on the reference; determine that the endpoint device supports a server-assisted bootstrapping procedure; obtain remote bootstrap data from a remote bootstrap server being external to the local network; generate a bootstrap data structure based on the device parameters and the remote bootstrap data; transmit a command to a network access server to configure the local network such that traffic on the local network to the remote bootstrap server is directed to the local bootstrap server; receive a bootstrap request from the endpoint device; and transmit the bootstrap data structure to the endpoint device.

According to a seventh aspect, it is provided a method for enabling configuring an endpoint device. The method is performed by an endpoint device, the method comprises: transmitting a network access request to a network access server, the network access request comprising a parameter request, the parameter request comprising a reference to a storage server for obtaining one or more device parameters, wherein the endpoint device is on a local network also comprising the network access server; receiving a network resource allocation message; transmitting a bootstrap request to remote bootstrap server being external to the local network; and receiving a bootstrap data structure from a local bootstrap server being on the same local network as the endpoint device.

The parameter request may further comprise an authentication code based on other data in the parameter request.

The authentication code may be based on a digital signature or a message authentication code.

The reference may be in the form of a Uniform Resource Identifier.

According to an eighth aspect, it is provided an endpoint device, for enabling configuring the endpoint device. The endpoint device comprises: a processor; and a memory storing instructions that, when executed by the processor, cause the endpoint device, to: transmit a network access request to a network access server, the network access request comprising a parameter request, the parameter request comprising a reference to a storage server for obtaining one or more device parameters, wherein the endpoint device is on a local network also comprising the network access server; receive a network resource allocation message; transmit a bootstrap request to remote bootstrap server being external to the local network; and receive a bootstrap data structure from a local bootstrap server being on the same local network as the endpoint device.

The parameter request may further comprise an authentication code based on other data in the parameter request.

The authentication code may be based on a digital signature or a message authentication code.

The reference may be in the form of a Uniform Resource Identifier.

According to a ninth aspect, it is provided a computer program for enabling configuring an endpoint device. The computer program comprises computer program code which, when executed on the endpoint device, causes the endpoint device, to: transmit a network access request to a network access server, the network access request comprising a parameter request, the parameter request comprising a reference to a storage server for obtaining one or more device parameters, wherein the endpoint device is on a local network also comprising the network access server; receive a network resource allocation message; transmit a bootstrap request to remote bootstrap server being external to the local network; and receive a bootstrap data structure from a local bootstrap server being on the same local network as the network endpoint device.

According to a tenth aspect, it is provided a computer program product comprising a computer program according to the third aspect, the sixth aspect or the ninth aspect and a computer readable means comprising non-transitory memory in which the computer program is stored.

According to an eleventh aspect, it is provided a system comprising the network access server according to the second aspect, the bootstrap server according to the fifth aspect and the endpoint device according to the eighth aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 3 is a schematic diagram illustrating a parameter request according to one embodiment;

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
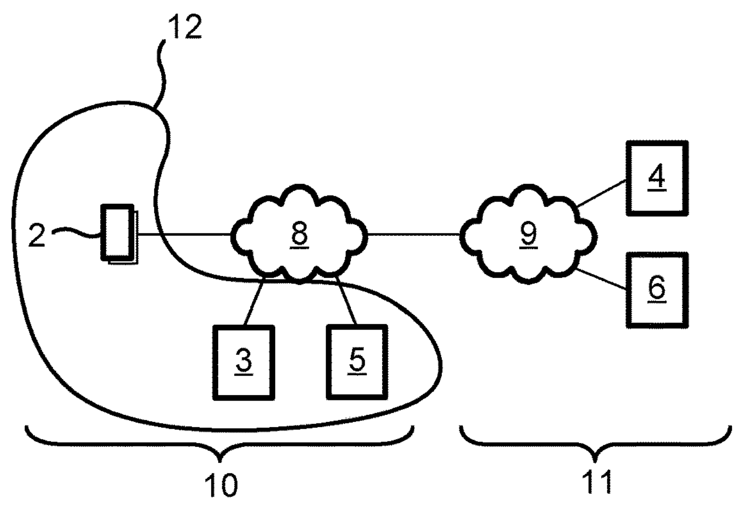
FIG. 1 is a schematic diagram illustrating an environment in which embodiments presented herein can be applied.

FIG. 1 is a schematic diagram illustrating an environment in which embodiments presented herein can be applied. One or more endpoint devices 2 are provided. In the following, the one or more endpoint devices 2 is referred to in singular form for reasons of clarity. The endpoint device 2 can be any suitable device that benefits from obtaining network access. For instance, the endpoint device 2 can be an Internet-of-Things (IoT) device, which is an electronic device that is typically provided for a specific purpose, with ability to provide information and/or be controlled by one or more other devices. IoT devices can be quite limited in its hardware resources and benefits from being easily deployed, preferably without any manual configuration.

A local network 8 is a data communication network provided to enable data communication between various local entities. The local network 8 can comprise one or more wire-based local networks, such as Ethernet, and/or one or more wireless-based networks, such as IEEE 802.1x (e.g. Wi-Fi), or based on Bluetooth or Bluetooth Low Energy (BLE).

The local network 8 is connected to a wide area network 9 which is a data communication network for access to remote entities. The wide area network 9 can comprise wired and/or wireless components, e.g. based on Ethernet, IEEE 802.1x (e.g. Wi-Fi), cellular networks complying with any one or a combination of next generation mobile networks (fifth generation, 5G), LTE (Long Term Evolution), UMTS (Universal Mobile Telecommunications System) utilising W-CDMA (Wideband Code Division Multiplex), or any other current or future wireless network.

Both the local network 8 and the wide area network 9 support IP (Internet Protocol) communication. Connections between various entities over the networks 8, 9 can be encrypted or secured otherwise, as known in the art per se.

For the description herein, the local network 8 and connected entities are collectively termed a local domain 10 and the wide-area network 9 and connected entities are collectively termed a remote domain 11. The local domain 10 can correspond to a single site, such as an industrial site of a home, while the remote domain 11 comprises everything external to the local domain 10.

The endpoint device 2 comprises a MUD (Manufacturer Usage Description) client for requesting appropriate access and network connection for its need. MUD is an embedded software standard defined by the IETF (Internet Engineering Task Force) that allows manufacturers of IoT Device to advertise device parameters, including the intended communication patterns for their device when it connects to the network. The device parameters are provided in a storage server 4 (here in the remote domain 11), and is referred to in a parameter request which contains a reference that can be in the form of a MUD URI (Uniform Resource Identifier). The network can then use this intent to author a context-specific access policy, so the device functions only within those parameters. The MUD becomes the authoritative identifier and enforcer of policy for devices on the network. The endpoint device 2 is only allowed to communicate with entities in the local domain 10, and is thus prevented from communicating with entities in the remote domain 11.

The endpoint device 2 also comprises a pre-configured client for a client-initiated OMA LwM2M bootstrap procedure. This procedure provides a mechanism for the LwM2M client to retrieve bootstrap information from an LwM2M bootstrap server. The LwM2M client comprises pre-configured TLS (Transport Layer Security)/DTLS (Datagram TLS), and/or OSCORE (Object Security for Constrained Restful Environments) security credentials that area preloaded in the endpoint device 2, for authentication with the bootstrap server to retrieve a bootstrap data structure. The bootstrap data structure, such as a bootstrap pack, contains at a minimum an LwM2M server account and may contain additional objects, e.g. for access control and connectivity monitoring. By using a bootstrap-pack in the bootstrap interface, an LwM2M client can be populated using a single message containing several objects and several instances of such objects. According to embodiments presented herein, there is a remote bootstrap server 6 in the remote domain 11 and a local bootstrap server 5 in the local domain 10. While the endpoint device 2 is configured to communicate with the remote bootstrap server 6, according to embodiments presented herein, the local network 8 is configured to direct such traffic to the local bootstrap server 5. This allows the endpoint device 2 to exploit the bootstrapping procedure, while being able to be restricted to only local domain 10 communication.

A network access server 3 is provided to provide network access to the endpoint device 2 when it is powered up or otherwise need network access. The network access server 3 can be provided in a single hardware device or can be implemented using several separate hardware devices in communication with each other. The network access server 3 comprises several different functions. For instance, the network access server 3 can include a net access device, an AAA (authentication, authorization, and accounting) server and a MUD controller. The net access device allows clients to gain access to the network and can be implemented based on DHCP (Dynamic Host Configuration Protocol), LLDP (Link Layer Discovery Protocol), any of the IEEE (Institute of Electrical and Electronics Engineers) 802.1x specifications or any other suitable protocol. The AAA server provides functions for access control. The MUD controller communicates with the endpoint device 2 to establish initial access and network functionality that is requested by the endpoint device 2.

When the endpoint device 2 wants to connect to a network it emits a parameter request, e.g. as a MUD URI, embedded in a LLDP, DHCP or 802.1X request to the network access server 3. This parameter request is extracted by the network access server 3, passed to the AAA server which passes the parameter request to the MUD Controller, which uses the parameter request to obtain the device parameters from the storage server 4. The storage server 4 is any suitable server capable of storing device parameters that are retrievable using the parameter request.

The local bootstrap server 5 is also connected to the local network 8. The local bootstrap server 5 can e.g. be an LwM2M bootstrap server. The remote bootstrap server 6 is connected to the wide-area network 9 and thus forms part of the remote domain 11. The local bootstrap server 5 and the remote bootstrap server 6 can e.g. be LwM2M bootstrap servers. As described in more detail below, the local network 8 is configured such that when the endpoint device 2 requests bootstrap data from the remote bootstrap server 6, this is routed to the local bootstrap server 5. The local bootstrap server 5 is provided the parameter request and exploits this for including network specific data when generating the bootstrap data structure for the endpoint device 2.

Collectively a system 12 comprises the endpoint device 2, the network access server 3 and the local bootstrap server 5.

Figure 2:
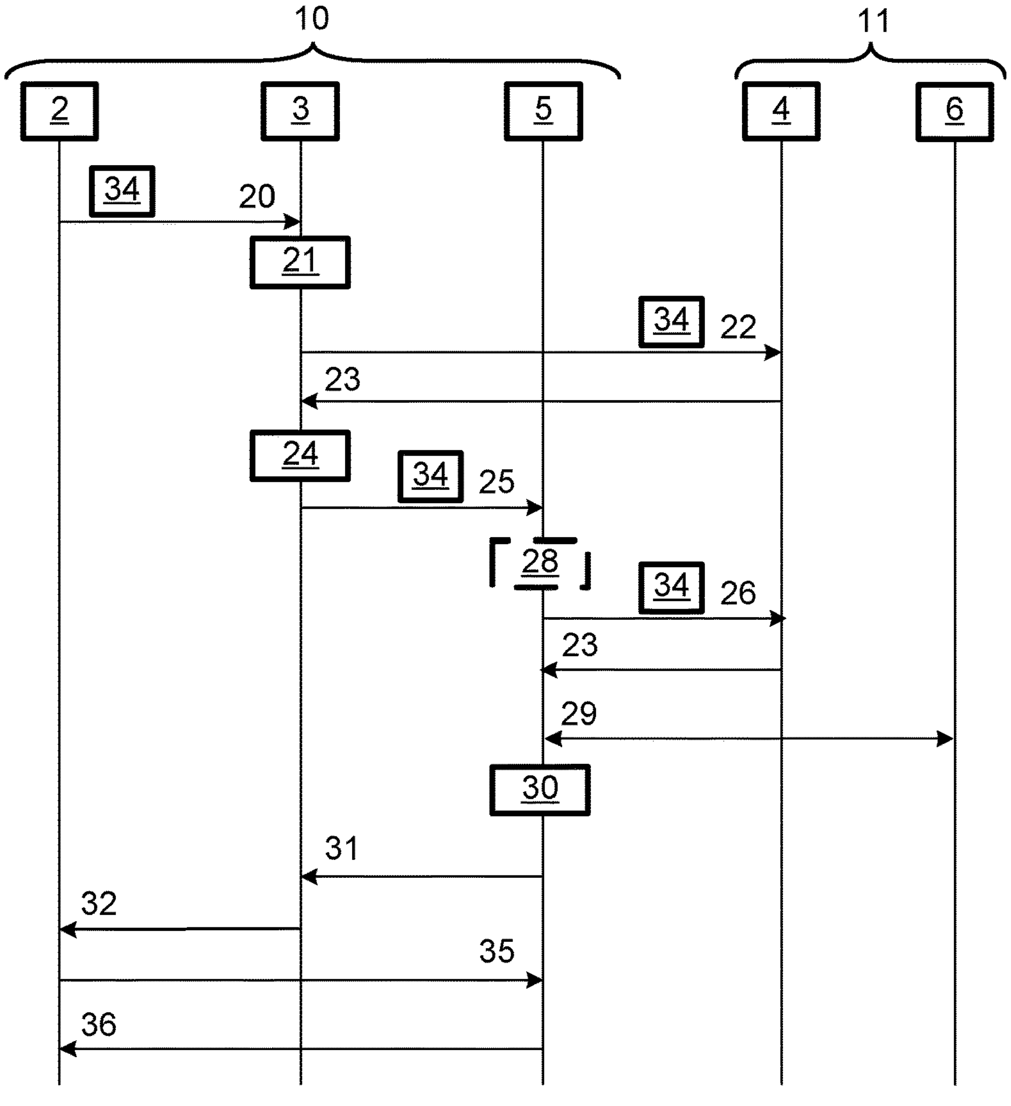
FIG. 2 is a sequence diagram illustrating communication between various entities in embodiments which can be applied in the environment of FIG. 1.

FIG. 2 is a sequence diagram illustrating communication between various entities in embodiments which can be applied in the environment of FIG. 1. Specifically, FIG. 2 illustrates communication between the endpoint device 2, the network access server 3, the local bootstrap server 5, the remote bootstrap server 6 and the storage server 4. The sequence starts when the endpoint device 2 is powered on or for some other reason needs network access. Reference is also made to FIG. 3, schematically illustrating a parameter request 34 according to one embodiment.

The endpoint device 2 sends a network access request 20 to the network access server 3. The network access request 20 can be an DHCP, LLDP, or IEEE 802.1x access request. The network access request 20 comprises a parameter request 34. The parameter request 34 can comprise a reference 15 that can be in the form of a MUD URI. Optionally, the parameter request 34 comprises an identifier 18 of the endpoint 2, e.g. "ep=8y3z92". Optionally, the parameter request 34 comprises an indicator 19 that the endpoint device supports bootstrapping e.g. "rt=oma.lwm2m". The parameter request 34 optionally also comprises authentication data 16 to allow verification of the integrity of the parameter request. The structure and content of the parameter request 34 can be hardcoded in the endpoint device 2 during manufacturing, to reduce requirements on the endpoint device 2. Alternatively, the parameter request 34 is constructed dynamically when needed by the endpoint device 2.

The network access server 3 receives the network access requests 20 and extracts the parameter request 34. The network access server 3 can then verify 21 the authenticity and integrity of the parameter request 34 with the help of underlying security technologies, e.g. using MACsec (Medium Access Control Security) or WPA2 (Wi-Fi Protected Access 2), based on the authentication data 16 of the parameter request 34.

At this stage, the network access server 3 requests 22 the device parameters based on the parameter request 34, which is a reference to a resource on the storage server 4. The storage server 4 responds with the device parameters 23 referred to in the parameter request 34. The device parameters 23 can be provided in the form of a MUD file.

The network access server 3 (or more specifically its MUD controller) then verifies the integrity of the device parameters 23, e.g. by verifying a MUD-SIGNATURE attribute in the MUD file. When the device parameters 23 are found to be valid, the network access server 3 configures an access control list based on the information in the device parameters 23.

The network access server 3 determines 24 that the endpoint device 2 is to be provided with bootstrap information. This can e.g. be achieved by checking if the parameter request indicates that the endpoint device supports bootstrapping. Alternatively or additionally, this can be achieved by checking details in the device parameters 23, such as addresses known to be associated with LwM2M servers and/or, ports such as CoAP/TCP: 5683 and CoAP/TLS: 5684 that are used for LwM2M communication.

When the endpoint device 2 is found to support bootstrapping, the network access device 3 sends a message 25 (e.g. a POST message) comprising the parameter request 34 to the local bootstrap server 5.

Optionally, the local bootstrap server 5 verifies 28 the endpoint device identity (when included) in the parameter request against a database of valid identities. This database can be populated with valid identities as part of the manufacturing process or provisioning process of endpoint devices 2.

The local bootstrap server 5 then sends a request 26 based on the parameter request 34 to the storage server 4, upon which the storage server 4 responds with the device parameters 23.

The local bootstrap server 5 communicates 29 with the remote bootstrap server to obtain remote bootstrap data. Based on the remote bootstrap data, as well as the information contained in the device parameters 23, and optionally the identifier of the endpoint device 2, the local bootstrap server 5 can create a more elaborate bootstrap data structure that is made available in the local domain 10. By knowing the network services allowed (indicated in the device parameters), as well the access control the local bootstrap server can generate 30 a bootstrap data structure that contains a more specific firmware update object and access control granularity that conforms with the network configuration determined by the network access server 3.

The local bootstrap server 5 then transmits a command 31 to the network access server 3 to configure the local network 8 (e.g. using DNS (Domain Name Service)) such that traffic on the local network 8 to the remote bootstrap server 6 is directed to the local bootstrap server 5.

Also, the network access server 3 transmits a network resource allocation message 32 (including e.g. IP address to use, gateway) to the endpoint device 2 to enable initial access to the network for the endpoint device.

When the endpoint device 2 sends a bootstrap request 35, this has a destination address corresponding to the remote bootstrap server 6. However, since the local network 8 is configured to direct traffic on the local network 8 destined for the remote bootstrap server 6 to instead be routed to the local bootstrap server 5, the bootstrap request 35 is provided to the local bootstrap server 5. The local bootstrap server 5 responds 36 with the generated tailor-made bootstrap data structure, and the bootstrapping of the endpoint device 2 can conclude by applying the bootstrap data structure.

Figures 4A, 4B, 5:
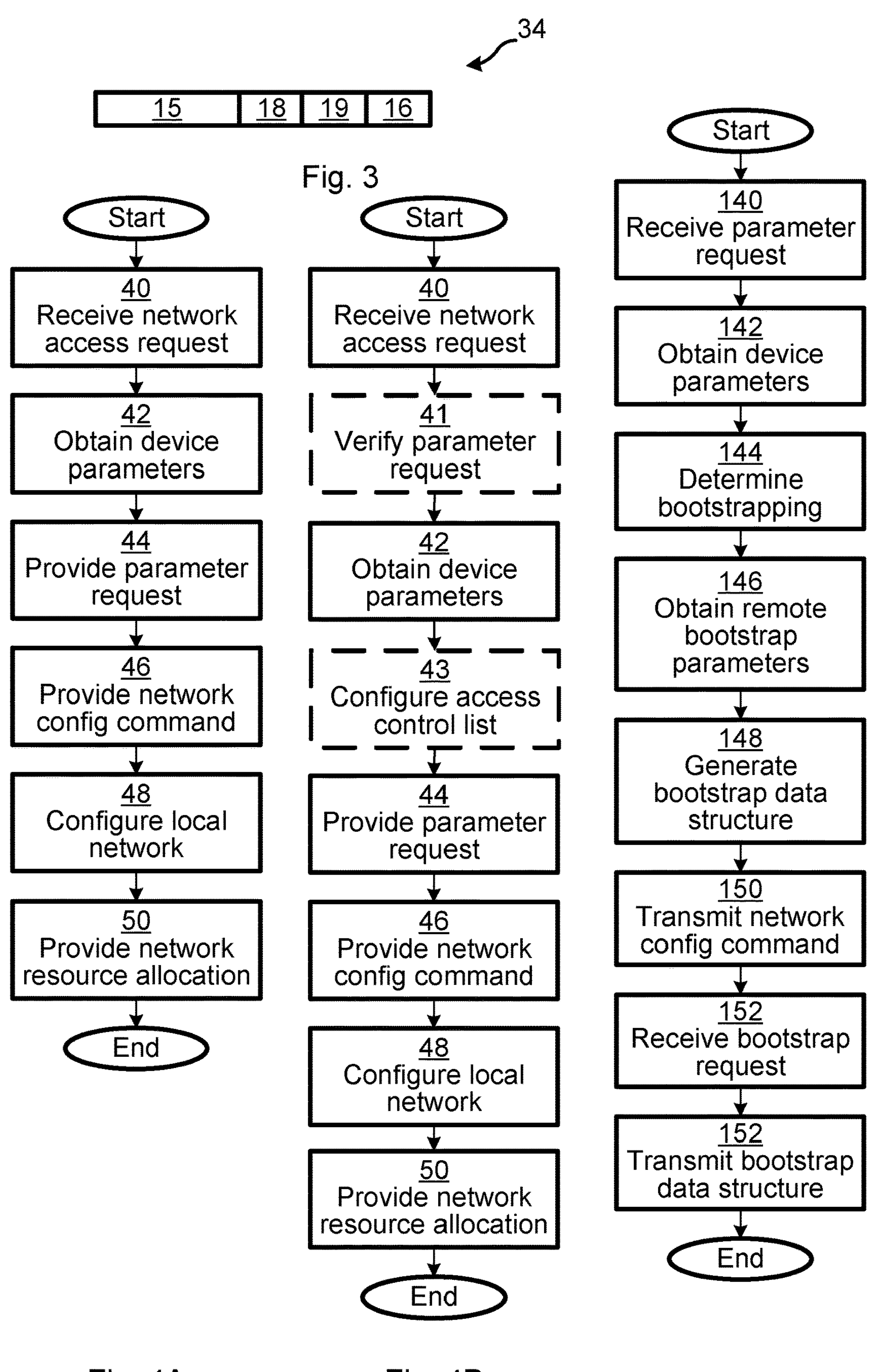
FIGS. 4A-B are flowcharts illustrating embodiments of methods for enabling configuring an endpoint device, performed by a network access server.
FIG. 5 is a flowchart illustrating embodiments of methods for enabling configuring an endpoint device, performed by a local bootstrap server.

FIGS. 4A-B are flowcharts illustrating embodiments of methods for enabling configuring an endpoint device, performed by a network access server 3. The steps correspond to the actions of the network access server 3 in FIG. 2. First, embodiments illustrated by FIG. 4A will be described.

In a receive network access request step 40, the network access server 3 receives a network access request from an endpoint device 2. The network access request comprises a parameter request 34 comprising a reference (e.g. as a URI) to a storage server 4 for obtaining device parameters. The parameter request optionally comprises an identifier 18 of the endpoint device and/or an indicator 19 to use a bootstrap procedure. The parameter request can e.g. comply with a specification of MUD defined in RFC (Request for Comments) 8520. The parameter request 34 optionally comprises authentication data 16 as described above. The endpoint device 2 is on a local network 8 also comprising the network access server 3.

The network access request can e.g. comply with LLDP, DHCP, or any of the IEEE 802.1x specifications.

In an obtain device parameters step 42, the network access server 3 obtains the device parameters from the storage server 4 based on the reference, e.g. using a HTTP (Hypertext Transfer Protocol) or COAP (Constrained Application Protocol) GET request. As defined in the MUD specification, the device parameters can comprise access control parameters.

In a provide parameter request step 44, the network access server 3 provides 44 the parameter request to a local bootstrap server 5 that is on the same local network 8 as the network access server 3. This allows the local bootstrap server 5 to consider the device parameter when generating the bootstrap data structure.

In a receive network config command step 46, the network access server 3 receives a command from the local bootstrap server 5 to configure the local network 8 such that traffic on the local network 8 to a remote bootstrap server 6, being external to the local network 8, is directed to the local bootstrap server 5.

In a configure local network step 48, the network access server 3 configures the local network 8 such that traffic on the local network 8 to the remote bootstrap server 6, being external to the local network 8, is directed to the local bootstrap server 5. The configuring can e.g. comprise configuring a DNS of the local network 8.

In a provide network resource allocation step 50, the network access server provides a network resource allocation message to the endpoint device 2, allowing the endpoint device 2 to connect to the network.

Looking now to FIG. 4B, only new or modified steps from FIG. 4A will be described.

In an optional verify parameter request step 41, the network access server 3 verifies integrity of the parameter request.

The MUD specification provides some solutions to verify the integrity of the MUD URI, such as Extensible Authentication Protocol (EAP) over Radius, Tunnel EAP (TEAP). Furthermore, there may be a need for additional security measures against malicious or malformed MUD URIs that could use resources unnecessarily.

In one embodiment, the parameter request (e.g. MUD URI) includes a digital signature or Message Authentication Code (MAC) as a parameter (see 16 of FIG. 3 and description above). The endpoint device 2 then adds an additional parameter to the parameter request, e.g. "st=<MAC/Digital_Signature>".

A cryptographic key or certificate used to sign the URI could be the same as the one used for subsequent bootstrap communication.

In an optional configure access control list step 43, the network access server 3 configures an access control list based on the device parameters.

FIG. 5 is a flowchart illustrating embodiments of methods for enabling configuring an endpoint device, performed by a local bootstrap server 5. The steps correspond to the actions of the local bootstrap server 5 in FIG. 2.

In a receive parameter request step 140, the local bootstrap server 5 receives a parameter request. The parameter request comprises a reference, e.g. in the form of a URI, to a storage server 4 for obtaining device parameters. The parameter request optionally comprises an identifier 18 of an endpoint device 2 and/or an indicator 19 to use a bootstrap procedure. As illustrated in FIG. 2, the parameter request can be received from the network access server 3. The endpoint device 2 is on a local network 8 also comprising the local bootstrap server 5.

In an obtain device parameters step 142, the local bootstrap server 5 obtains the device parameters from the storage server 4 based on the reference, e.g. using a HTTP or COAP GET request.

In a determine bootstrapping step 144, the local bootstrap server 5 determines that the endpoint device 2 supports a server-assisted bootstrapping procedure.

This determination can e.g. be based on the device parameters, such as addresses and/or ports associated with LwM2M. Alternatively or additionally, this determination can be achieved by checking if the parameter request indicates that the endpoint device supports bootstrapping.

In an obtain remote bootstrap data step 146, the local bootstrap server 5 obtains remote bootstrap data from a remote bootstrap server 6 being external to the local network 8. This can be achieved using a HTTP or COAP GET request. The remote bootstrap server 6 can be server of the manufacturer of the endpoint device 2. The remote bootstrap server 6 can be identified based on the identity of the endpoint device 2.

The remote bootstrap data can e.g. be any one or more of keys, configurations, partial or full bootstrap-packs, the name of the bootstrap server configured on the endpoint device 2, credentials such as a security token or certificate, and pre-configured LwM2M objects. It is to be noted that the obtaining of remote bootstrap data can be performed individually for each endpoint device 2, or in bulk for a family of devices (if such information exists). In the case of shared security tokens, these can be shared over an encrypted communication channel between the remote bootstrap server 6 and the local bootstrap server 6. When credentials are based on private keys or certificates, a method based on delegation of capabilities can be employed. In this case, the remote bootstrap server 6 can delegate the local bootstrap server 5 a more restrictive capability (e.g., predicate encryption allows one to evaluate only parts of the encrypted data) covering only that specific endpoint device, thereby not exposing the private key/certificate or providing excessive access rights.

It is to be noted that in one embodiment, the remote bootstrap server 6 is provided locally in a different context, e.g., as a virtual machine or a Docker container.

In a generate bootstrap data structure step 148, the local bootstrap server 5 generates a bootstrap data structure based on the device parameters and the remote bootstrap data. The bootstrap data structure can comply with a bootstrap pack as defined in OMA (Open Mobile Alliance) LwM2M.

The generating a bootstrap data structure can also be based on the identifier 18 of the endpoint device.

The device parameters can comprise access control parameters. In this case, the generating a bootstrap data structure can also be based on the access control parameters.

In a transmit network config command step 150, the local bootstrap server 5 transmits a command to a network access server 3 to configure the local network 8 such that traffic on the local network 8 to the remote bootstrap server 6 is directed to the local bootstrap server 5;

In a receive bootstrap request step 152, the local bootstrap server 5 receives a bootstrap request from the endpoint device 2. Optionally, the parameter request is included in the bootstrap request from the endpoint device 2, e.g. in the credentials used in the bootstrap request during establishment of secure communication between the endpoint device 2 and the local bootstrap server 5.

For example, a device certificate used in the authentication of the endpoint device 2 could include the parameter request, or an (D) TLS extension used in establishment of the secure communication could include the parameter request. This provides the local bootstrap server with more assurances that the parameter request is correct before generating and providing the bootstrap data structure.

In a transmit bootstrap data structure step 154, the local bootstrap server 5 transmits the bootstrap data structure to the endpoint device 2.

Figures 6, 7, 8:
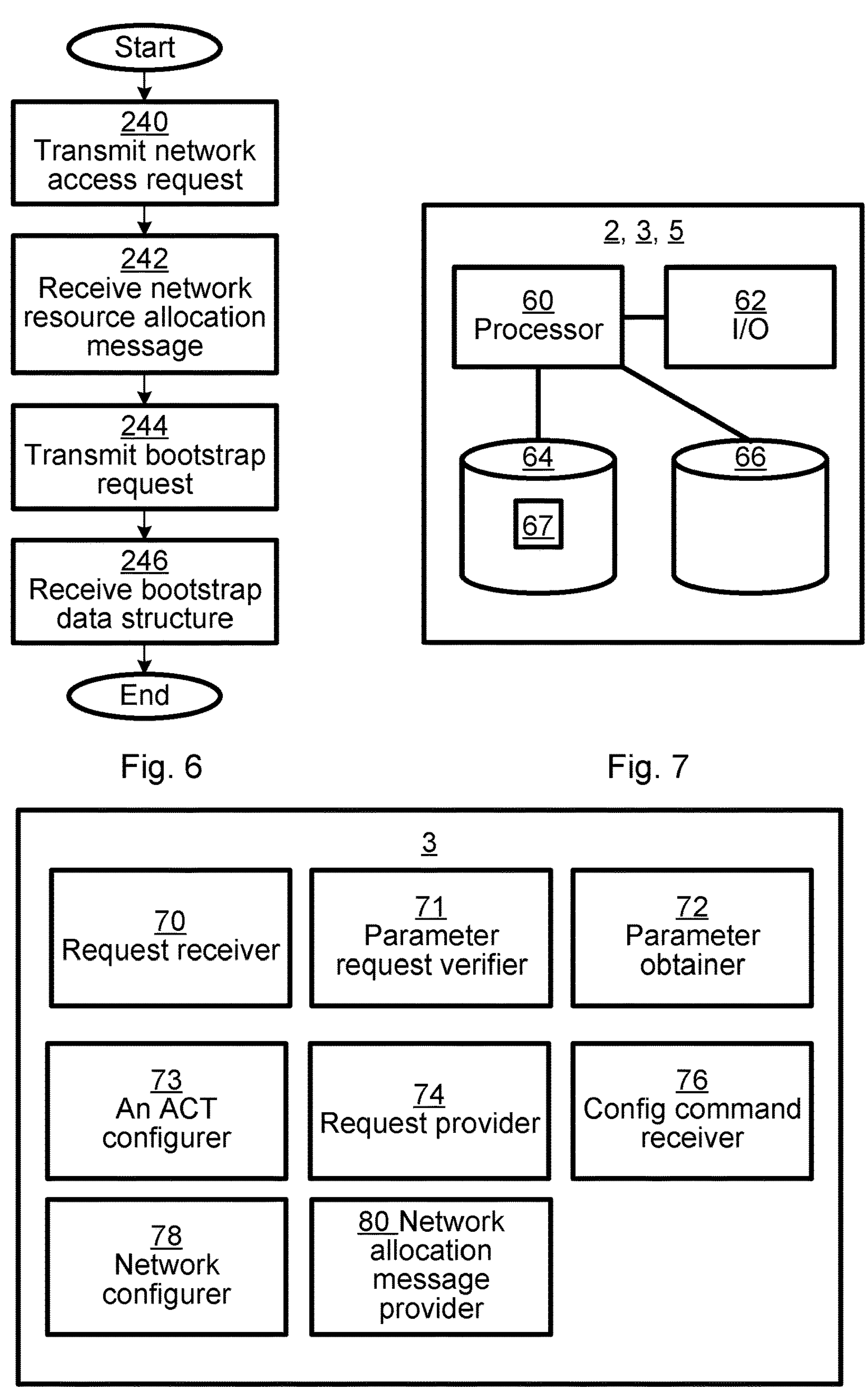
FIG. 6 is a flowchart illustrating embodiments of methods for enabling configuring an endpoint device, performed by an endpoint device.
FIG. 7 is a schematic diagram illustrating components of the endpoint device, the network access server and local bootstrap server of FIG. 1.
FIG. 8 is a schematic diagram showing functional modules of the network access server of FIG. 1 according to one embodiment.

FIG. 6 is a flowchart illustrating embodiments of methods for enabling configuring an endpoint device, performed by an endpoint device 2. The steps correspond to the actions of the endpoint device 2 in FIG. 2.

In a transmit network access request step 240, the endpoint device 2 transmits a network access request to a network access server 3. The network access request comprises a parameter request comprising a reference (e.g. in the form of a URI). The parameter request comprises a reference to a storage server 4 for obtaining device parameters. The parameter request optionally comprises an identifier 18 of the endpoint device 2 and/or an indicator 19 to use a bootstrap procedure. As explained above, the endpoint device 2 is on a local network 8 also comprising the network access server.

The parameter request can further comprise an authentication code based on other data in the parameter request. The authentication code is based on a digital signature or a message authentication code.

In a receive network resource allocation message step 242, the endpoint device 2 receives a network resource allocation message. At this point, the endpoint device can connect to the network e.g. on an IP level.

In a transmit bootstrap request step 244, the endpoint device 2 transmits a bootstrap request (prior to re-routing) to a remote bootstrap server 5 being external to the local network 8.

In a receive bootstrap data structure step 246, the endpoint device 2 receives a bootstrap data structure (e.g. a LwM2M bootstrap pack) from the local bootstrap server 5 being on the same local network 8 as the endpoint device 2. This allows the endpoint device 2 to apply the objects in the bootstrap data structure to complete its booting process, e.g. by applying configuration and/or firmware updates defined in the bootstrap data structure.

The embodiments presented herein pre-provision a custom bootstrap data structure to a local bootstrap server for a new endpoint device joining a network. The parameter request is passed to the local server which checks. The bootstrap procedure/traffic for the endpoint device is thereby restricted to the local network, providing improved security, e.g. for industrial scenarios such as factory floors or for securing residential deployments.

The provisioning of the bootstrap data structure is an on-demand process, triggered by the parameter request (e.g. MUD).

The provisioning of the bootstrap data structure is performed while the endpoint device 2 obtains local network connectivity, which speeds up the bootstrap procedure. Moreover, by having a local bootstrap server, multicast network configurations is enabled. The local bootstrap server 3 can have knowledge of local management servers and can securely store credentials for these, without exposing these for endpoint devices.

The embodiments presented herein exploits the information in the parameter request (e.g. MUD URI) and the device parameters (e.g. a MUD file) when the bootstrap data structure is generated. In this way, the bootstrap data structure is set up to configure services and service access in alignment with network configuration, applications and device management.

FIG. 7 is a schematic diagram illustrating components of the endpoint device 2, the network access server 3 and local bootstrap server 5 of FIG. 1. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 4A-B above for the network access server 3, the method described with reference to FIG. 5 above for the local bootstrap server 5 and the method described with reference to FIG. 6 above for the endpoint device 2.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

An I/O interface 62 is provided for communicating with external and/or internal entities using wired communication, e.g. based on Ethernet, and/or wireless communication, e.g. Wi-Fi, and/or a cellular network, as long as the principles described hereinafter are applicable.

Other components are omitted in order not to obscure the concepts presented herein.

FIG. 8 is a schematic diagram showing functional modules of the network access server 3 of FIG. 1 according to one embodiment. The modules are implemented using software instructions such as a computer program executing in the network access server 3. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A-B.

A request receiver 70 corresponds to step 40. A parameter request verifier 71 corresponds to step 41. A parameter obtainer 72 corresponds to step 42. An ACL (Access Control List) configurer 73 corresponds to step 43 A request provider 74 corresponds to step 44. A config command receiver 76 corresponds to step 46. A network configurer 78 corresponds to step 48. A network allocation message provider 80 corresponds to step 50.

Figure 9:
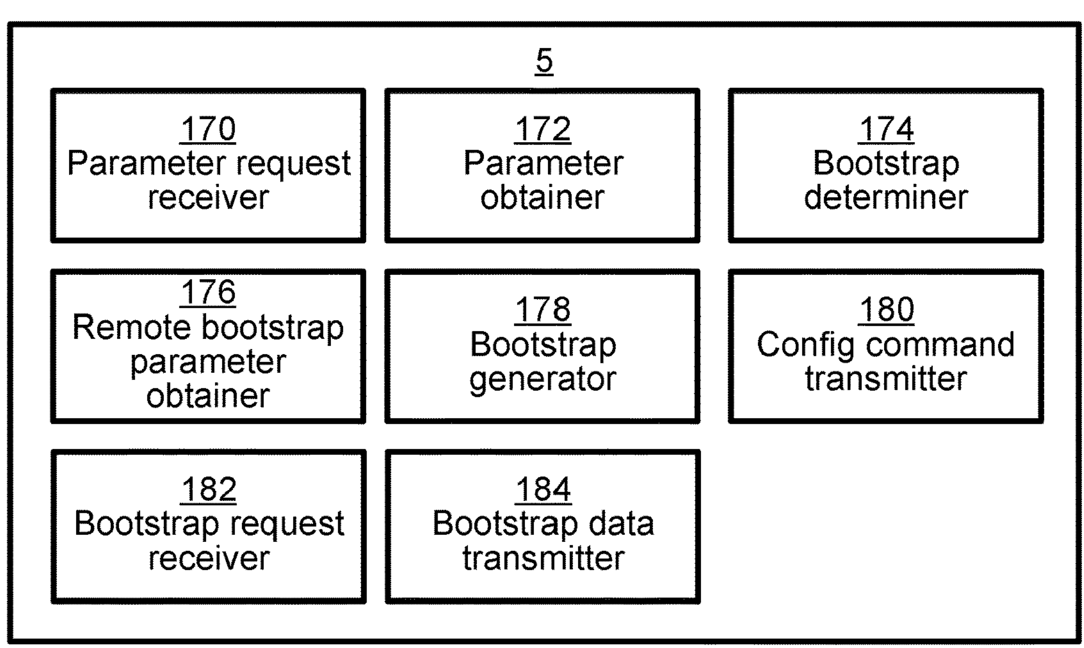
FIG. 9 is a schematic diagram showing functional modules of the local bootstrap server of FIG. 1 according to one embodiment.

FIG. 9 is a schematic diagram showing functional modules of the local bootstrap server 5 of FIG. 1 according to one embodiment. The modules are implemented using software instructions such as a computer program executing in the local bootstrap server 5. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 5.

A parameter request receiver 170 corresponds to step 140. A parameter obtainer 172 corresponds to step 142. A bootstrap determiner 174 corresponds to step 144. A remote bootstrap parameter obtainer 176 corresponds to step 146. A bootstrap generator 178 corresponds to step 148. A configure command transmitter 180 corresponds to step 150. A bootstrap request receiver 182 corresponds to step 152. A bootstrap data transmitter 184 corresponds to step 154.

Figure 10:
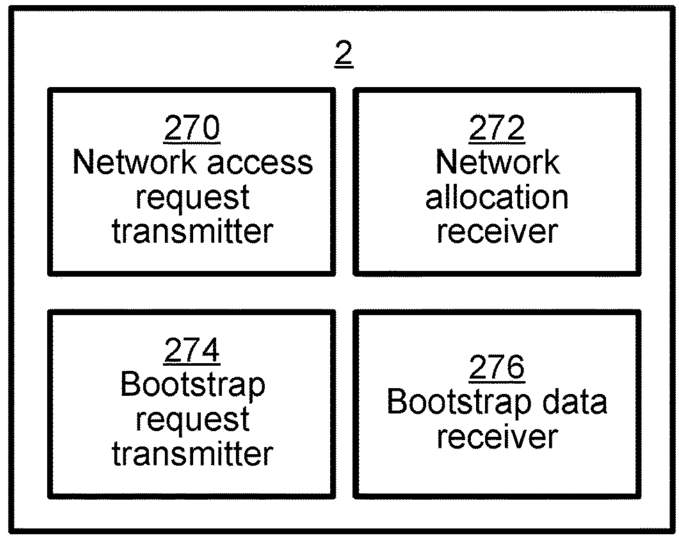
FIG. 10 is a schematic diagram showing functional modules of the endpoint device of FIG. 1 according to one embodiment.

FIG. 10 is a schematic diagram showing functional modules of the endpoint device 2 of FIG. 1 according to one embodiment. The modules are implemented using software instructions such as a computer program executing in the endpoint device 2. Alternatively or additionally, the modules are implemented using hardware, such as any one or more of an ASIC, an FPGA, or discrete logical circuits. The modules correspond to the steps in the methods illustrated in FIG. 6.

A network access request transmitter 270 corresponds to step 240. A network allocation receiver 272 corresponds to step 242. A bootstrap request transmitter 274 corresponds to step 244. A bootstrap data receiver 276 corresponds to step 246.

Figure 11:
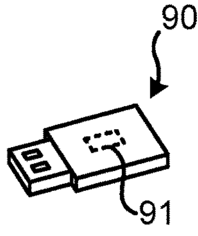
FIG. 11 shows one example of a computer program product 90 comprising computer readable means.

FIG. 11 shows one example of a computer program product 90 comprising computer readable means. On this computer readable means, a computer program 91 can be stored in a non-transitory memory. The computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 7. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art.

The various aspects and embodiments disclosed herein are for purposes of illustration and are not intended to be limiting, with the true scope and spirit being indicated by the following claims.

The invention claimed is:

1. A method for enabling configuring an endpoint device, the method being performed by a network access server, the method comprising:

receiving a network access request from the endpoint device, the network access request comprising a parameter request, the parameter request comprising a reference to a storage server for obtaining one or more device parameters, wherein the endpoint device is on a local network also comprising the network access server;

obtaining the device parameters from the storage server based on the reference;

providing the parameter request to a local bootstrap server that is on the same local network as the network access server;

receiving a command from the local bootstrap server to configure the local network;

configuring the local network such that traffic on the local network to a remote bootstrap server, being external to the local network, is directed to the local bootstrap server; and providing a network resource allocation message to the endpoint device.

2. The method according to claim 1, wherein the configuring the local network comprises configuring a domain name service of the local network.

3. The method according to claim 1, wherein the parameter request complies with a specification for Manufacturer Usage Description as defined in Internet Engineering Task Force Request for Comments, 8520.

4. The method according to claim 1, wherein the device parameters comprise access control parameters.

5. The method according to claim 1, wherein the network access request complies with Link Layer Discovery Protocol, Dynamic Host Configuration Protocol, or Institute of Electrical and Electronics Engineers, 802.1x.

6. The method according to claim 1, wherein the reference is in the form of a Uniform Resource Identifier.

7. The method according to claim 1, further comprising: verifying integrity of the parameter request.

8. The method according to claim 1, further comprising: configuring an access control list based on the device parameters.

9. A computer program product comprising a non-transitory computer readable medium storing a computer program, the computer program comprising computer program code which, when executed on a network access server, cause the network access server to perform the method according to claim 1.

10. A method for enabling configuring an endpoint device the method being performed by a local bootstrap server, the method comprising:

receiving a parameter request, the parameter request comprising a reference to a storage server for obtaining one or more device parameters, wherein the endpoint device is on a local network also comprising the local bootstrap server;

obtaining the device parameters from the storage server based on the reference;

determining that the endpoint device supports a server-assisted bootstrapping procedure;

obtaining remote bootstrap data from a remote bootstrap server being external to the local network;

generating a bootstrap data structure based on the device parameters and the remote bootstrap data;

transmitting a command to a network access server to configure the local network;

receiving a bootstrap request from the endpoint device; and transmitting the bootstrap data structure to the endpoint device.

11. The method according to claim 10, wherein the bootstrap procedure complies with specifications of Open Mobile Alliance, Lightweight Machine to Machine.

12. The method according to claim 10, wherein the determining that the endpoint device supports a server-assisted bootstrapping procedure is based on the device parameters.

13. The method according to claim 10, wherein the receiving a parameter request comprises receiving the parameter request from a network access server.

14. The method according to claim 10, wherein the device parameters comprise access control parameters, and wherein the generating a bootstrap data structure is based on the access control parameters.

15. The method according to claim 10, wherein the reference is in the form of a Uniform Resource Identifier.

16. A computer program product comprising a non-transitory computer readable medium storing a computer program, the computer program comprising computer program code which, when executed on a local bootstrap server, causes the local bootstrap server to perform the method according to claim 10.

17. A method for enabling configuring an endpoint device, the method being performed by the endpoint device, the method comprising:

transmitting a network access request to a network access server, the network access request comprising a parameter request, the parameter request comprising a reference to a storage server for obtaining one or more device parameters, wherein the endpoint device is on a local network also comprising the network access server;

receiving a network resource allocation message;

transmitting a bootstrap request to a remote bootstrap server being external to the local network; and receiving a bootstrap data structure from a local bootstrap server being on the same local network as the endpoint device.

18. The method according to claim 17, wherein the parameter request further comprises an authentication code based on other data in the parameter request.

19. The method according to claim 18, wherein the authentication code is based on a digital signature or a message authentication code.

20. The method according to claim 17, wherein the reference is in the form of a Uniform Resource Identifier.

21. A computer program product comprising a non-transitory computer readable medium storing a computer program, the computer program comprising computer program code which, when executed on an endpoint device, causes the endpoint device, to perform the method according to claim 17.

* * * * *